United States Patent
Dean, Jr.

(10) Patent No.: US 8,098,587 B2
(45) Date of Patent: Jan. 17, 2012

(54) NETWORK ACCESS DEVICE

(75) Inventor: Douglas W. Dean, Jr., San Antonio, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 644 days.

(21) Appl. No.: 11/316,276

(22) Filed: Dec. 22, 2005

(65) Prior Publication Data
US 2007/0147420 A1    Jun. 28, 2007

(51) Int. Cl.
*G01R 31/08*   (2006.01)
(52) U.S. Cl. ............... 370/252; 370/466; 375/222
(58) Field of Classification Search ......... 370/401, 370/465, 466
See application file for complete search history.

(56) References Cited

U.S. PATENT DOCUMENTS

| | | | |
|---|---|---|---|
| 5,889,470 A * | 3/1999 | Kaycee et al. | 370/465 |
| 6,804,267 B1 * | 10/2004 | Long et al. | 370/524 |
| 6,810,041 B2 | 10/2004 | Walker, III et al. | |
| 6,894,983 B1 * | 5/2005 | Lederman et al. | 370/252 |
| 7,031,345 B1 * | 4/2006 | Haber | 370/493 |
| 7,190,783 B2 * | 3/2007 | Gerlach et al. | 379/399.01 |
| 7,492,761 B1 * | 2/2009 | Farr et al. | 370/389 |
| 2002/0071440 A1 | 6/2002 | Cerami et al. | |

OTHER PUBLICATIONS

Get Ready for G.SHDSL, ADTRAN, Inc., Feb. 2001, 8 pages.
Coffield, Once and Future DSL, eWeek Technology News, Oct. 1, 2001, 5 pages.
Prestige 724 G.SHDSL CSU/DSU, ZyXEL Communications, 2001, 4 pages.
Resilient Inter-Metro Hierarchical VPLS, Alcatel, 2004, pp. 1-7.
IpRocketLink G.SHDSL Frame Replay Integrated Access Device, V.35 Interface, (M34F) Port, Internal PS, PC Connection, Inc., 2005, 3 pages.
ViNE6428p-VoIP (SIP/MGCP), DataFlex, http://www.dataflex.com; retrieved May 9, 2005, 2 pages.
iMarc G.SHDSL Devices, Intelligent G.SHDSL Products With Advanced Diagnostics and Service Level Management Features, Paradyne Corporation, http://www.paradyne.com, retrieved May 18, 2005, 2 pages.

* cited by examiner

*Primary Examiner* — Jung Park
(74) *Attorney, Agent, or Firm* — Jackson Walker L.L.P.

(57) ABSTRACT

The present disclosure describes a system and apparatus for providing a network service, such as Frame Relay. The apparatus transmits the service to the network utilizing a G.SHDSL transmission standard; converts data between data utilizing a DS-1 transmission standard and data utilizing a G.SHDSL transmission standard; stores a parameter relating to the network service (e.g., bandwidth); and provides access to the parameter to the network. The apparatus further includes a database for storing the parameters relating to the network service, and a processor for running a program, such as an emulator, to convert the data. The processor also may set an operation in response to a signal received from the network, including synchronizing a clock in the apparatus with a network clock, changing a bandwidth of the apparatus, and upgrading a computer program at the apparatus.

7 Claims, 6 Drawing Sheets

NETWORK ACCESS DEVICE

BACKGROUND OF THE DISCLOSURE

1. Field of the Disclosure

The present disclosure relates to an apparatus and method for connecting a network using Symmetric High Bit Rate Digital Subscriber Loop (G.SHDSL) as a transmission standard to customer premises equipment (CPE).

2. Background

A common method for connecting to a network from a residence or small/midsize business is to provide a device that enables broadband signals to travel over existing phone lines using a technology known as Digital Subscriber Loop (DSL). A typical DSL connection transmits data over a two or four-wire connection. The most common form of DSL is Asymmetric DSL (ADSL), which provides more bandwidth for data transfer in the downstream (to the customer) direction than in the upstream (to the network) direction. Digital Signal level 1 (DS-1) is a transmission standard often used over High Bit Rate Digital Subscriber Loop (HDSL) connections. DS-1 generally provides a symmetric signal transmission at an optimized data rate of 1.544 million bits per second (Mbps). Current broadband connections typically provide data services, such as analog voice service or Frame Relay service, over the DS-1 connection.

Symmetric High Bit Rate Digital Subscriber Loop (G.SHDSL) is an international transmission standard for Symmetric High Bit Rate Digital Subscriber Loop services. G.SHDSL provides a symmetrical connection to a user, the connection thus having the same bandwidth in both the upstream (to the network) and downstream (to the customer) directions. G.SHDSL may be used over a dry copper pair loop. A dry loop is a connection without any applied voltage or amperage and characterized by not carrying a supervisory signal over it, such as a dial tone indicating the state of the connection. G.SHDSL is often targeted for use in providing services to small and midsize companies and generally offers higher data rates than common DSL services.

Currently, access devices that terminate a G.SHDSL connection are capable of transferring data between the CPE and the network. Beyond that, the access device has little or no operative interaction with the network. An access device with increased capabilities to interact with the network would increase the effectiveness of the network connection. The present disclosure provides an access device capable of adapting a DS-1 connection to customer premise equipment (CPE) to a G.SHDSL network connection.

BRIEF DESCRIPTION OF THE DRAWINGS

For detailed understanding of the present disclosure, references should be made to the following detailed description of an exemplary embodiment, taken in conjunction with the accompanying drawings, in which like elements have been given like numerals, wherein.

DETAILED DESCRIPTION OF THE DISCLOSURE

Figure 1:
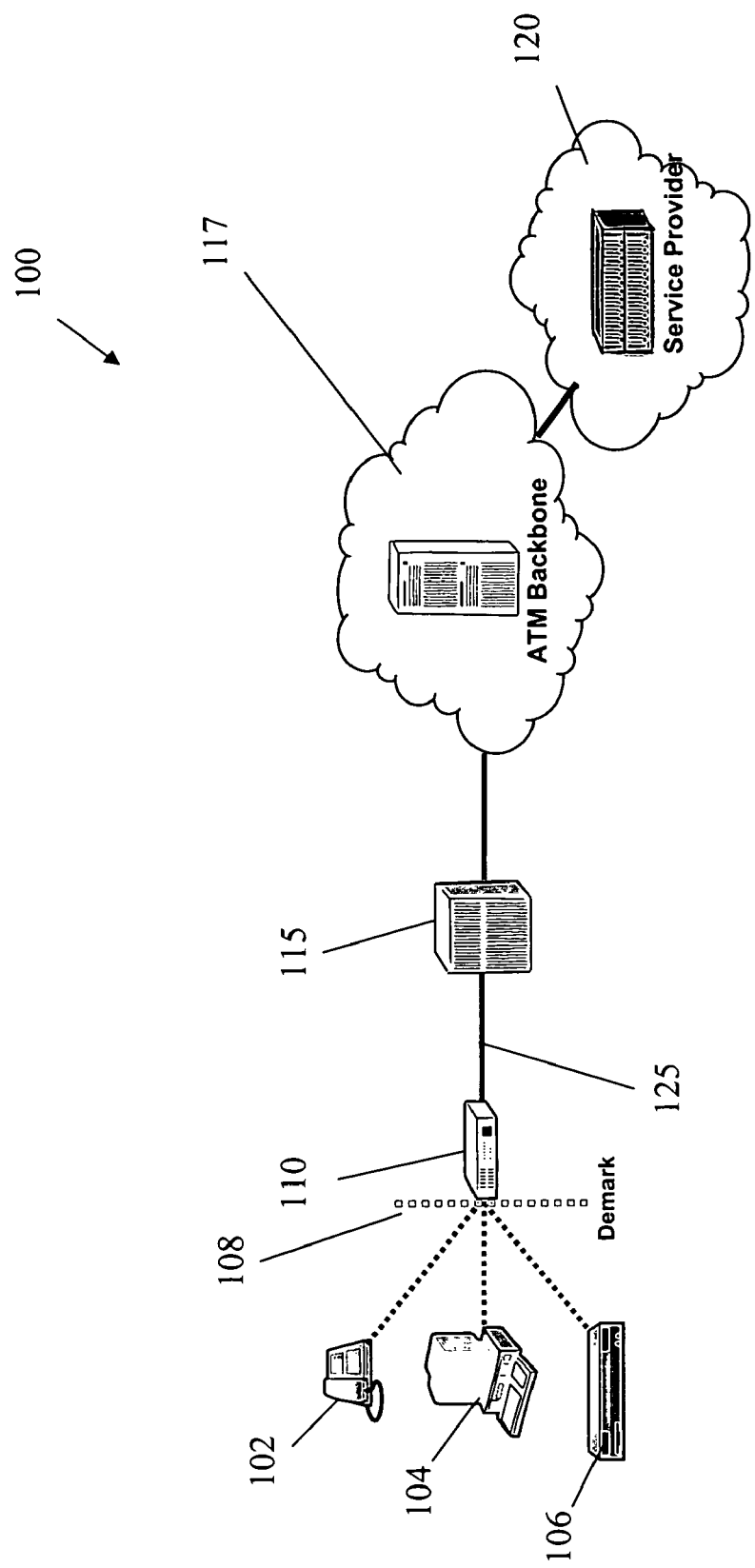
FIG. 1 illustrates an exemplary network providing a G.SHDSL connection between various customer premise equipment (CPE) and a network.

In view of the above, the present disclosure through one or more of its various aspects and/or embodiments is presented to provide one or more advantages, such as those noted below.

The present disclosure describes an apparatus for providing a network service which includes a database that stores a parameter relating to the network service; and a processor that provides access to the parameter to a network device and converts data between data utilizing a Digital Service level 1 (DS-1) transmission standard and data utilizing a Symmetric High Bit Rate Digital Subscriber Loop (G.SHDSL) transmission standard. The apparatus further includes an emulator usable by the processor to convert the data between data utilizing a Digital Service level 1 (DS-1) transmission standard and data utilizing a Symmetric High Bit Rate Digital Subscriber Loop (G.SHDSL) transmission standard. In one aspect, the stored parameter may be one of network utilization, latency, network availability, bandwidth, and bit rate. The processor may provide the network service as one of: Frame Relay, Asynchronous Transfer Mode, Ethernet, and voice signals, for example. The processor may further set an operation in response to a signal received from the network device. Exemplary operations may include synchronizing a clock in the apparatus with a network clock; changing the parameters, such as bandwidth, class of service, etc., of an existing permanent virtual circuit; adding a permanent virtual circuit; and upgrading a computer program.

Another aspect of the disclosure describes a computer-readable medium containing a set of instructions operative to cause a computer to execute a method, the method including converting data at an access device between data utilizing a DS-1 transmission standard and data utilizing a G.SHDSL transmission standard, storing a parameter relating to a network service at the access device, and providing access to the stored parameter to a network. In one aspect, the parameter relating to the network service may be one of: network utilization, latency, network availability, bandwidth, and bit rate. The network service may be one of: Frame Relay, Asynchronous Transfer Mode, Ethernet, and voice signals. The method further includes using an emulator to convert the data between data utilizing a Digital Service level 1 (DS-1) transmission standard and data utilizing a Symmetric High Bit Rate Digital Subscriber Loop (G.SHDSL) transmission standard. The method further includes setting an operation at an access device in response to a received signal. Some exemplary operations include synchronizing a clock in the access device with a network clock; changing the parameters, such as bandwidth, class of service, etc., of an existing permanent virtual circuit at the access device; adding a permanent virtual circuit at the access device; and upgrading a computer program at the access device.

Another aspect of the disclosure describes a system for providing a network service, the system including: a device that transmits the network service utilizing a G.SHDSL transmission standard; and an access device connected to the transmitting device that 1) converts data between data utilizing a DS-1 transmission standard and data utilizing a G.SHDSL transmission standard, 2) stores a parameter relating to the network service, and 3) provides access to the parameter to the transmitting device. The access device further includes a database for storing the parameter relating to the network service, and a processor for converting the data. The access device further includes an emulator used by the processor to convert the data between data utilizing a DS-1 transmission standard and data utilizing a G.SHDSL transmission standard. The processor of the access device may provide the network service as one of Frame Relay, Asynchronous Transfer Mode, Ethernet, and voice signals. The processor of the access device may set an operation in response to a signal received from the transmitting device, including synchronizing a clock in the access device with a network clock; changing the parameter, such as bandwidth, class of service, etc., of an existing permanent virtual circuit at the access device; adding a permanent virtual circuit at the access device; and upgrading a computer program at the access device. In one aspect, the parameter relating to the network service may include network utilization, latency, network availability, bandwidth, and bit rate. In one aspect of the system, the transmitting device further includes a Digital Subscriber Line Access Multiplexer (DSLAM) or other such platform terminating the G.SHDSL line.

FIG. 1 illustrates an exemplary network 100 that provides a G.SHDSL connection between customer premises equipment (CPE) and a network via an access device according to an embodiment of the present disclosure. An access device 110 provides an interface between a Digital Subscriber Line Access Multiplexer (DSLAM) 115 and various CPE (e.g., telephone 102, computer 104, set-top box 106). A DSLAM is a device used to provide DSL connections to multiple customer locations and to link multiple customer DSL connections into a single high-speed network. The DSLAM generally aggregates signals from the multiple customers and separates these signals according to signal type. For example, the DSLAM may separate voice signals and data signals, onto their appropriate networks, such as a voice network and a data network, respectively. In the exemplary network, the access device 110 connects to the DSLAM 115 via a connection 125, which is typically a dry copper pair loop, to a G.SHDSL card inserted at the DSLAM, the card enabling G.SHDSL to be used as a transmission standard over the connection. The access device communicates with network devices, such as the DSLAM 115, using G.SHDSL as a transmission standard for data transfer.

DSLAM 115 connects to an Asynchronous Transfer Mode (ATM) backbone 117 for data transfer. ATM is a network technology for transferring data in cells or packets of a fixed size instead of variable sized packets as in packet-switched networks (such as the Internet Protocol or Ethernet). The ATM backbone 117 connects to an Internet Service Provider (ISP) 120 network, which provides various network content, such as Voice over Internet Protocol (VoIP), Internet data, Video on Demand, usable by the various CPE (e.g., telephone 102, computer 104, set-top box 106). The DSLAM 115, ATM backbone 117, and ISP 120 make up an existing network infrastructure.

Demarcation line 108 indicates a point of separation between the network devices and the non-network devices, such as the CPE. The access device 110 of the present disclosure serves as a network device, i.e., is a part of the network infrastructure, thereby extending the network and network capabilities. These capabilities include making the access device visible to the network; network management, including changing a parameter of a network service at the access device; and administration of the access device from the network.

Figure 2:
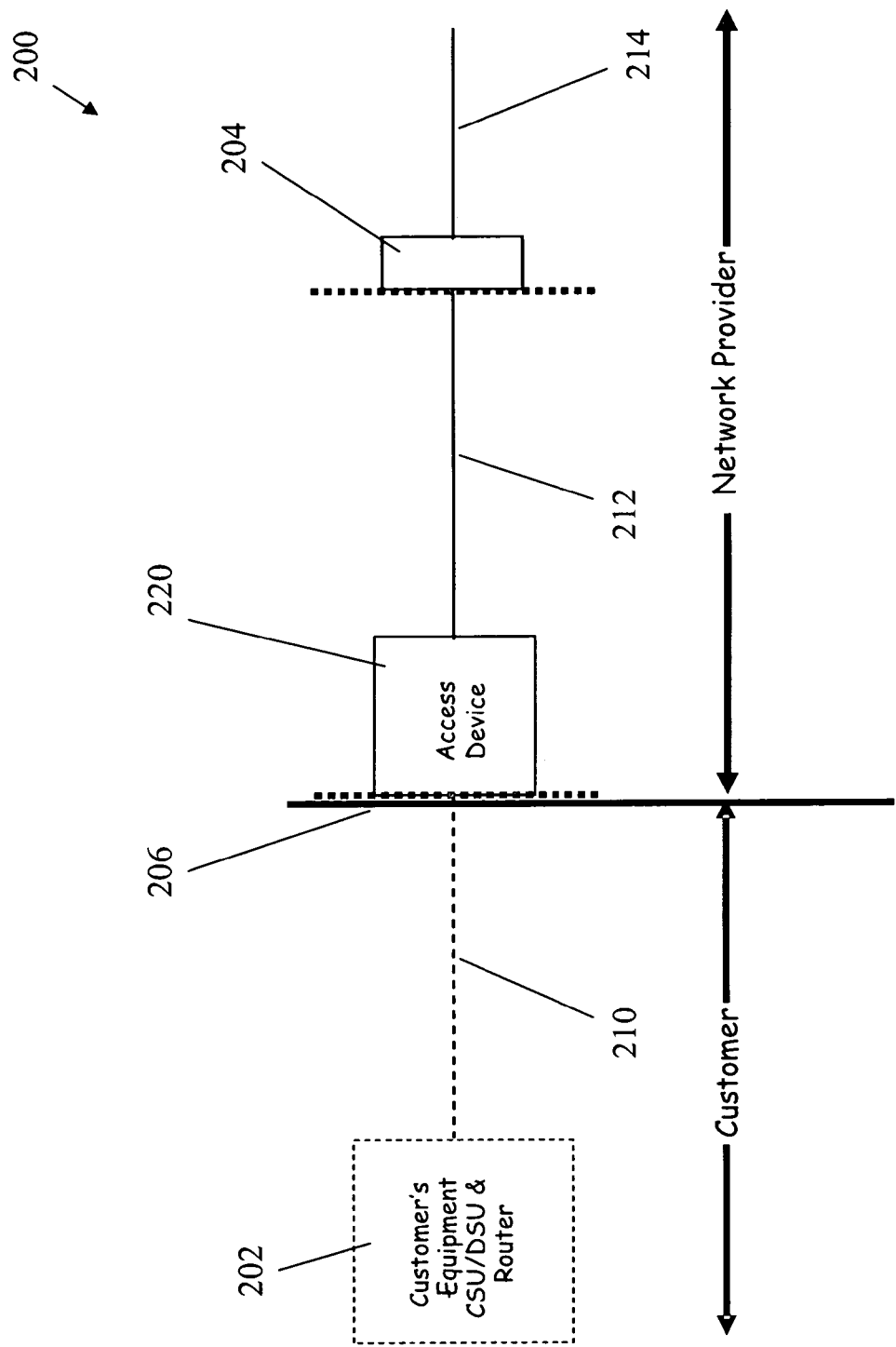
FIG. 2 illustrates a customer connection integrating an exemplary access device according to an embodiment of the present disclosure with existing technologies at a customer location.

FIG. 2 is a diagram that depicts a customer connection 200 that integrates an access device 220 with existing technologies at a customer location. The access device 220 connects with a Channel Service Unit/Data Service Unit (CSU/DSU) 202 over a DS-1 connection 210. The DS-1 connection is typically a four-wire connection, such as an RJ-48c connection. A CSU/DSU is a digital-interface device used to connect a CPE, such as a personal computer, to a digital circuit line, such as a DS-1 connection. The CSU/DSU may be a stand-alone device, but is often integrated into a modem, router or other network interface device. The CSU/DSU connects to the CPE (e.g., 102, computer 104, set-top box 106 of FIG. 1) over one or more serial connections and hands off the data from the CPE via the DS-1 connection 210 to the access device for handoff 212 from the access device to the network. The access device 220 also connects to a wiring block 204 by a jumper connection 212. The jumper connection 212 is usually a two-wire jumper, but may also be a multi-pair connection. The wiring block 204 connects to the network through a dry copper pair loop 214 using G.SHDSL as a transmission standard. The access device 220 converts between data transmittable over the DS-1 connection 210 and data transmittable over the G.SHDSL connection 214 of the network. Demarcation line 206 indicates a point of separation between network devices and non-network devices. Network equipment, such as wiring block 204, access device 220, jumper 212, and dry copper pair loop 214 are shown to the right of demarcation line 206. Non-network equipment of the customer (e.g. CSU/DSU device 202 and DS-1 connection 210) is shown to the left of demarcation line 206.

The access device 220 of the disclosure may support any number of network data services, such as Frame Relay (a service designed for data transmission of intermittent traffic between Local Area Networks (LANs) and between endpoints in a Wide Area Network (WAN)), Ethernet, voice, etc. The access device 220 terminates the network loop and converts from data utilizing the G.SHDSL transmission standard to an appropriate data stream that is transmittable using the DS-1 transmission standard. The type of service (i.e., Frame Relay, ATM) provided may be changed by substituting a access device suitable for one service to an access device suitable for another service. Thus, the provided network service may be changed without changing the underlying network infrastructure.

Figure 3:
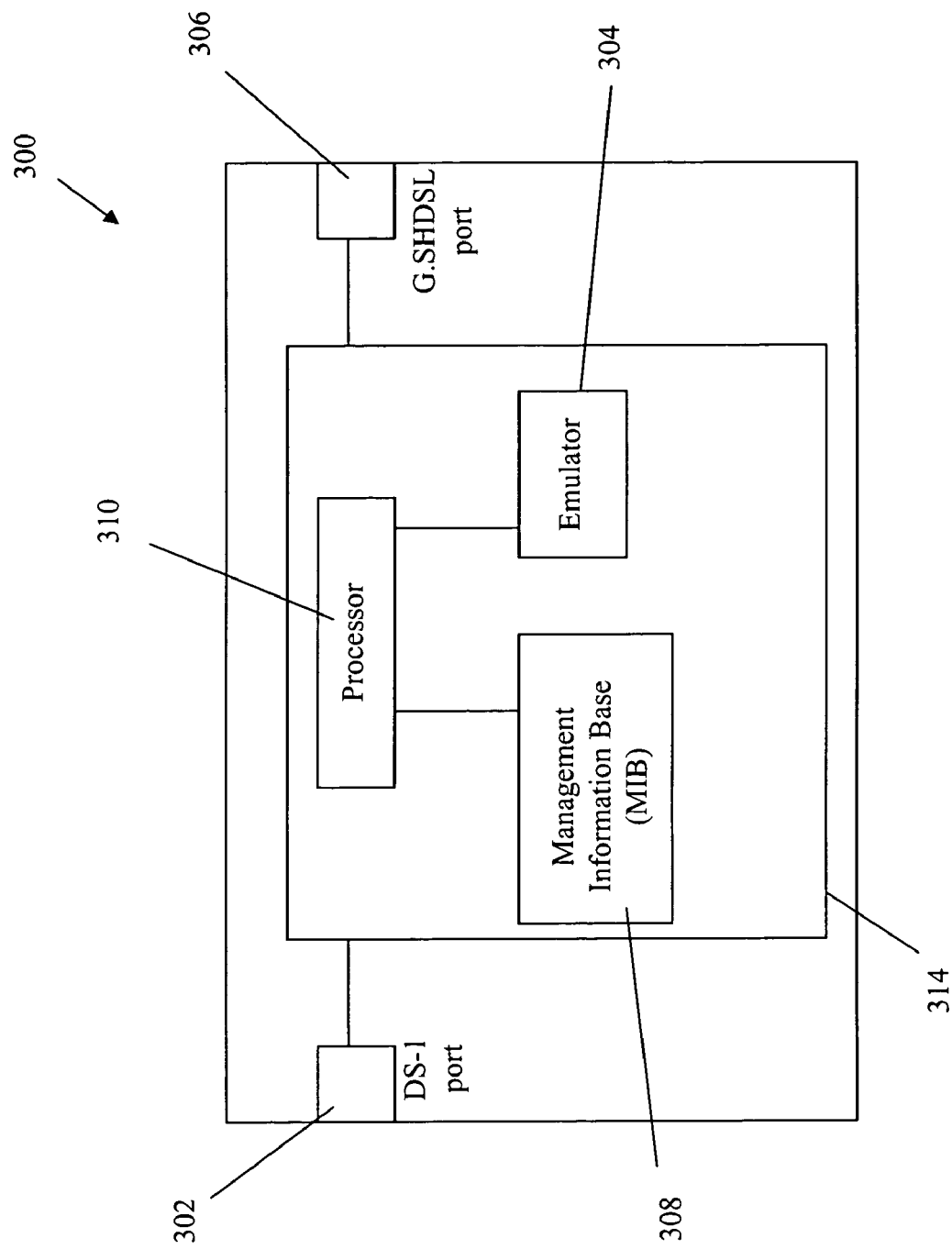
FIG. 3 illustrates a block diagram of exemplary components of the access device.

FIG. 3 illustrates a block diagram of exemplary components of the access device 300. The exemplary access device includes a G.SHDSL port 306 for terminating a G.SHDSL connection from a network, and a DS-1 port 302 for providing a DS-1 connection to a device at a customer location. The access device further includes a module 314 located along the connection between the G.SHDSL port 306 and the DS-1 port 302 that performs various functions on the DS-1 data stream and on the G.SHDSL data stream as well as on the operation of the access device. The module 314 includes a Management Information Base (MIB) 308 for storing a parameter related to a service, a processor 310 for executing one or more programs, such as a program for data conversion and a program for data transfer, etc, and an emulator 304 that converts data between transmission standards and provides a DS-1 interface at DS-1 port 302 and a G.SHDSL interface at G.SHDSL port 306. In one aspect, the processor may convert a data stream between a DS-1 transmission level of the customer and the G.SHDSL transmission level of the network. The processor may use the emulator 304 to provide a DS-1 interface to the customer, convert the data between the DS-1 and G.SHDSL transmission standards, and provide an interface with the network over a G.SHDSL connection, and. Data passing between the G.SHDSL port and the DS-1 port passes through module 314.

The Management Information Base (MIB) 308 collects and stores a parameter, such as may be related to a service. Some exemplary parameters may include bandwidth, volume of data traffic, latency, network availability, network utilization, etc. The stored service parameter may be retrieved remotely from the MIB 308 by a device or a processor located at any place within the network. Alternatively, a program running on the processor may send a parameter stored in the MIB to a network device at pre-selected time intervals. The service parameter may be used, for instance, to create customer reports on utilization, latency, network availability, etc. These reports may be viewed by network operations engineers or others to validate that the network is working, to check the performance of the network connection, to determine the amount of usage being generated over the connection, etc. In another aspect, processor 310 may run a program that enables the access device to receive signals from the network to initiate a change in an operation of the access device. As an example, the access device may receive a signal causing the access device to change the bandwidth of the service, thereby enabling on-demand sensitivity of the bandwidth to the customer. As another example, the clock of the access device may be synchronized with a network clock. In yet another aspect, the access device may also implement software upgrades sent from the network.

An exemplary embodiment of the disclosure provides smooth interoperability between Frame Relay and ATM network connections through support for Frame Relay to ATM service interworking, such as the FRF.8.2 standard. The access device also supports a real-time variable bit rate (rt-VBR) service level useful for delivering time-sensitive application such as voice and real-time video; a non-real-time variable bit rate (nrt-VBR) service level useful for bursty traffic, such as Internet traffic; and an unspecified bit rate (UBR) service level that is useful for non-critical data such as file transfers. The UBR service level is commonly used for Internet Protocol (IP) and ATM networks. The access device may support multiple virtual circuits (VCs). The access device provides remotely controlled loop back capabilities to both the network and to customer sides of the access device. These loop back capabilities may be useful for remote testing and diagnostics, among other things. The access device may be detected by the network automatically over a dedicated management channel which may be a permanent virtual circuit between the network and the access device. Also, remote management and administration capabilities, such as downloading software upgrades from the network and changing the bandwidth of the customer connection, may be provided over this dedicated channel.

The access device may provide ASCII text-based menu screens for remotely monitoring, managing, and testing the access device. Typically, this is done remotely from an element management system compatible with the access device or locally using an RJ-45 Ethernet craft access port which is usually labeled and password protected. The access device further provides input and output ports supporting multiple jack standards, such as RJ-11 (analog telephony), RJ-45 (Ethernet), and RJ-48c (DS-1). Timing may be derived through synchronization of an internal clock of the access device with a network clock. Light emitting diodes (LEDs) may be used, for example, to indicate status for access device power, status of the data streams, the status (enabled/disabled) of the loop back to the network, and the status (enabled/disabled) of the loop back to the CPE.

Figure 4:
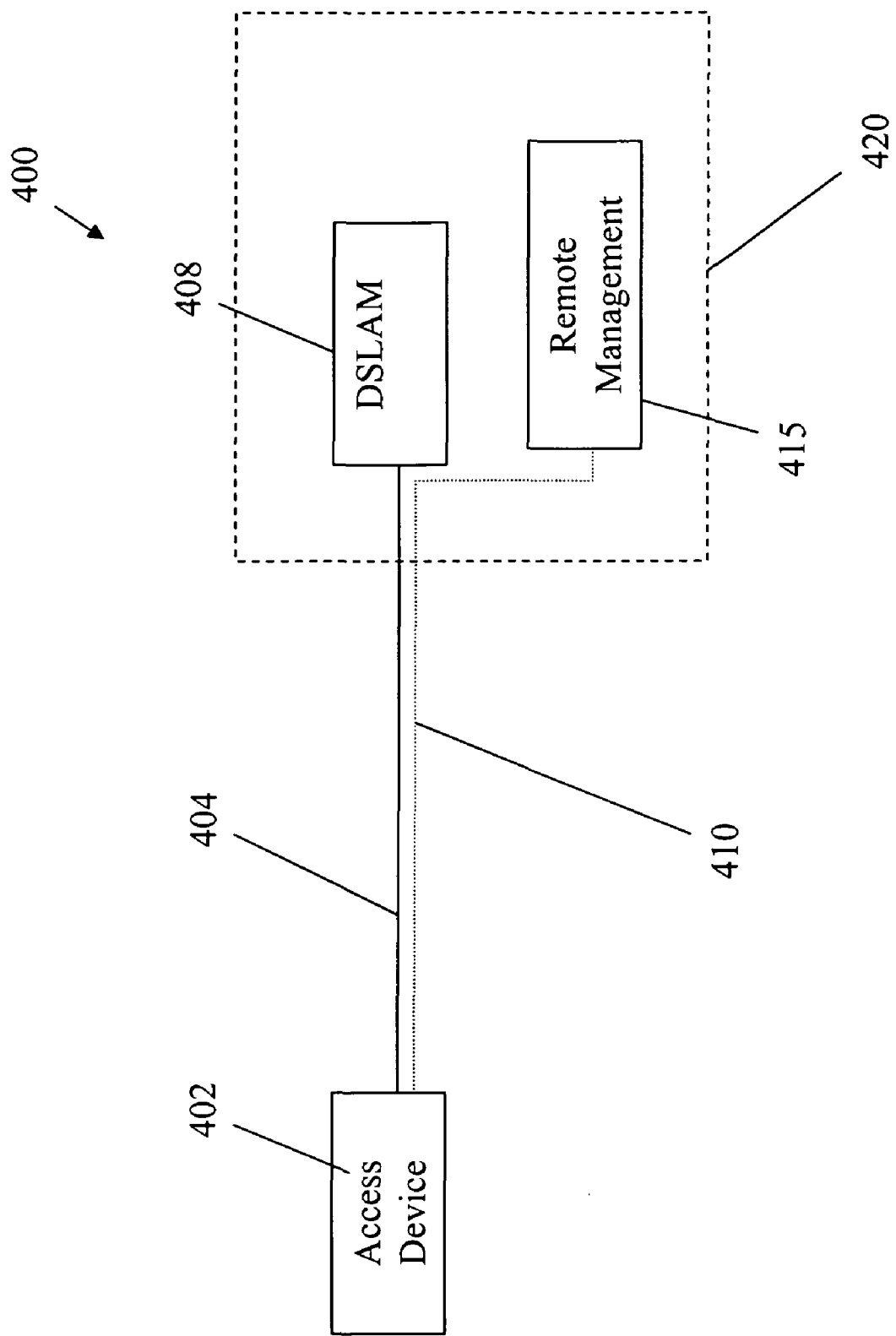
FIG. 4 illustrates a connection enabling remote management of the access device of the present disclosure.

FIG. 4 illustrates a connection 400 enabling remote management of the access device of the present disclosure. Access device 402 is connected to DSLAM 408 over connection 404. Upon installation at the customer location, the access device 402 becomes aware of the network and is automatically detected by a remote management device 415 located at Central Office 420. One or more permanent virtual circuits, such as permanent virtual circuit 410, may be established between the access device 402 and the remote management device 415 to provide remote management capabilities, such as downloading parameters of the permanent virtual circuit to the access device, adding a permanent virtual circuit to the access device and synchronizing the clock running at the access device with a network clock.

Figure 5:
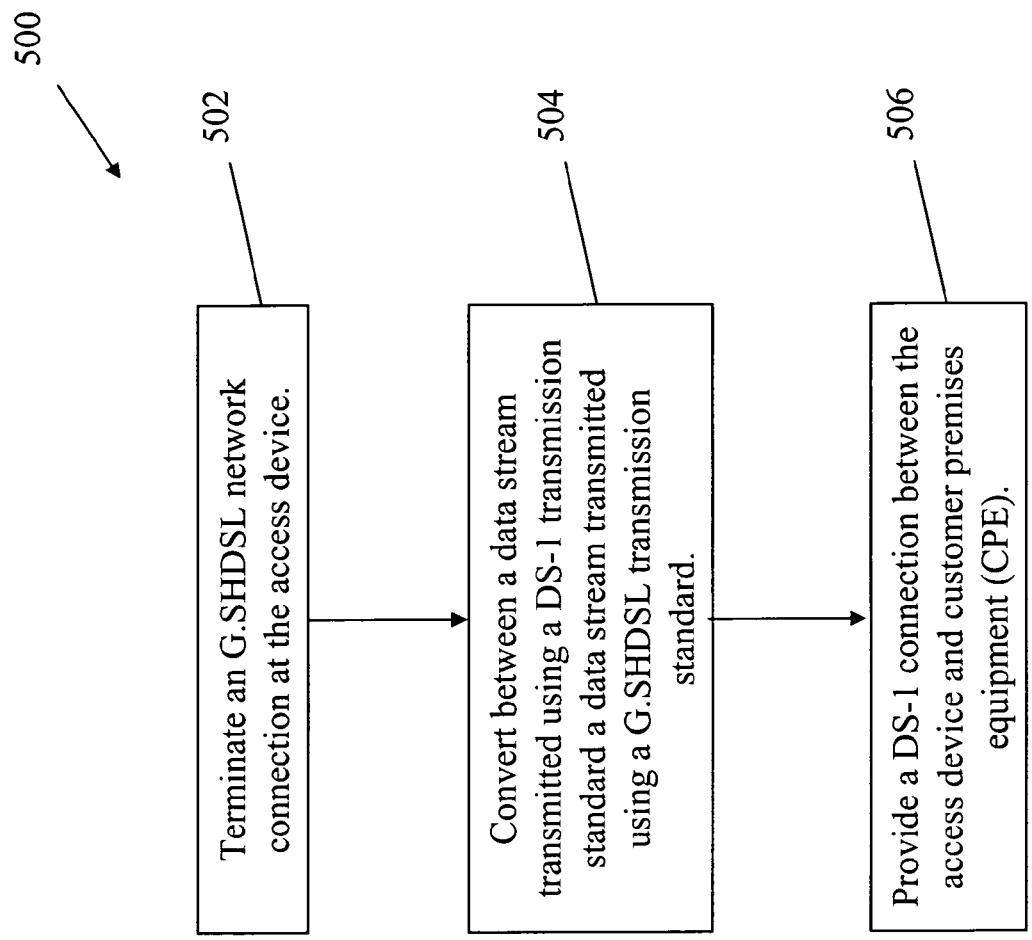
FIG. 5 illustrates a flowchart describing an exemplary method for transmitting data from the customer premises equipment to the network using the access device of the present disclosure.

FIG. 5 illustrates a flowchart 500 describing a method for transmitting data from the CPE to the G.SHDSL network using the access device of the present disclosure. In Box 502, the G.SHDSL network is terminated at the access device, using, for example, G.SHDSL port 306 of FIG. 3. A conversion software run by a processor, converts data from data utilizing a DS-1 transmission standard (to the CPE) and data utilizing a G.SHDSL transmission standard to the network (Box 504). In Box 506, a connection (i.e., DS-1 port 302 or FIG. 3) is provided between a CPE at the customer location and the access device.

Figure 6:
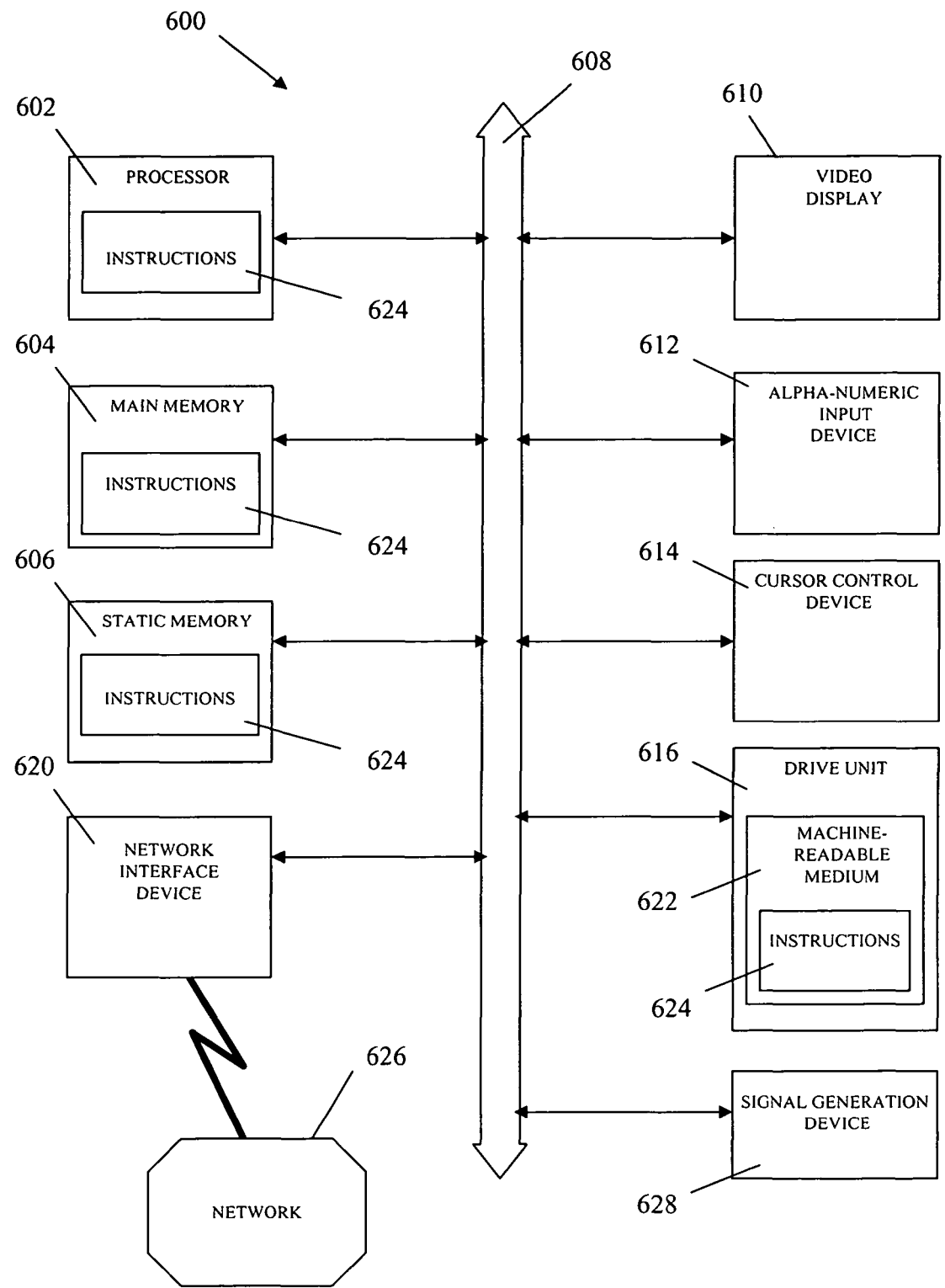
FIG. 6 illustrates a diagram of a machine in the form of a computer system within which a set of instructions, when executed, may cause the machine to perform any one or more of the methodologies of the present disclosure.

FIG. 6 is a diagrammatic representation of a machine in the form of a computer system 600 within which a set of instructions, when executed, may cause the machine to perform any one or more of the methodologies discussed herein. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment. The machine may comprise a server computer, a client user computer, a personal computer (PC), a tablet PC, a set-top box (STB), a Personal Digital Assistant (PDA), a cellular telephone, a mobile device, a palmtop computer, a laptop computer, a desktop computer, a personal digital assistant, a communications device, a wireless telephone, a land-line telephone, a control system, a camera, a scanner, a facsimile machine, a printer, a pager, a personal trusted device, a web appliance, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD), a flat panel, a solid state display, or a cathode ray tube (CRT)). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methodologies or functions described herein, including those methods illustrated in herein above. The instructions 624 may also reside, completely or at least partially, within the main memory 604, the static memory 606, and/or within the processor 602 during execution thereof by the computer system 600. The main memory 604 and the processor 602 also may constitute machine-readable media. Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 from a propagated signal so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk Or tape. Accordingly, the disclosure is considered to include any one or more of a machine-readable medium as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "disclosure" merely for convenience and without intending to voluntarily limit the scope of this application to any single disclosure or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus for providing a network service, comprising:
   a processor having access to a non-transitory machine readable medium embedding processor-executable instructions and a database;
   a first port configured to communicate with customer premise equipment in compliance with a digital service level 1 transmission standard and a second port configured to communicate with a digital subscriber line access multiplexer in compliance with a symmetric high bit rate digital subscriber loop transmission standard;
   wherein the database stores a network service parameter selected from the group consisting of network utilization, latency, network availability, and bandwidth;
   wherein the processor executable instructions include instructions to:

convert data between data utilizing a digital service level 1 transmission standard and data utilizing a symmetric high bit rate digital subscriber loop transmission standard;

provide access to the network service parameter to a network device; and communicate, via a dedicated management channel, with a remote management device to enable the remote management device to manage an aspect of the network service via the apparatus.

2. The apparatus of claim 1, wherein the processor executable instructions further include emulator instructions to convert the data between data utilizing the digital service level 1 transmission standard and data utilizing the symmetric high bit rate digital subscriber loop transmission standard.

3. The apparatus of claim 1, wherein the network service is selected from the group consisting of frame relay, asynchronous transfer mode, Ethernet, and voice signals.

4. The apparatus of claim 1, wherein the dedicated management channel comprises a permanent virtual channel.

5. The apparatus of claim 4, wherein the remote management device is configured to perform one of synchronizing a clock in the apparatus with a network clock, changing a feature of the network service, and upgrading a computer program.

6. The apparatus of claim 5, wherein changing a feature of the network service comprises changing a bandwidth of the network service.

7. The apparatus of claim 1, wherein the network service is selected from the group consisting of: providing interoperability between frame relay and asynchronous transfer mode network connections, a real-time variable bit rate service, a non-real-time variable bit rate service, and an unspecified bit rate service.

* * * * *